(12) United States Patent
Bowers et al.

(10) Patent No.: US 7,904,949 B2
(45) Date of Patent: Mar. 8, 2011

(54) APPARATUS, SYSTEMS AND METHODS TO PROVIDE AUTHENTICATION SERVICES TO A LEGACY APPLICATION

(75) Inventors: John Joseph Bowers, Provo, UT (US); Matthew T Peterson, Lindon, UT (US)

(73) Assignee: Quest Software, Inc., Aliso Viejo, CA (US)

( * ) Notice: Subject to any disclaimer, the term of this patent is extended or adjusted under 35 U.S.C. 154(b) by 1257 days.

(21) Appl. No.: 11/311,215

(22) Filed: Dec. 19, 2005

(65) Prior Publication Data

US 2007/0143836 A1    Jun. 21, 2007

(51) Int. Cl.
| | |
|---|---|
| G06F 7/04 | (2006.01) |
| G06F 15/16 | (2006.01) |
| G06F 17/30 | (2006.01) |
| H04L 29/06 | (2006.01) |
| H04L 9/32 | (2006.01) |
| H04L 9/00 | (2006.01) |
| H04N 7/16 | (2011.01) |
| B41K 3/38 | (2006.01) |
| H04K 1/00 | (2006.01) |

(52) U.S. Cl. ............. 726/10; 726/27; 713/155; 713/168; 380/59; 380/255; 380/277

(58) Field of Classification Search .................. 726/2–4, 726/10, 16, 17, 21; 713/150, 153, 155, 168, 713/169, 171; 380/59, 255, 259, 260, 262, 380/277–279, 282, 285
See application file for complete search history.

(56) References Cited

U.S. PATENT DOCUMENTS

| | | | |
|---|---|---|---|
| 4,370,707 A | 1/1983 | Phillips et al. | |
| 4,694,397 A | 9/1987 | Grant et al. | |
| 5,222,018 A | 6/1993 | Sharpe et al. | |
| 5,267,865 A | 12/1993 | Lee et al. | |
| 5,302,132 A | 4/1994 | Corder | |
| 5,310,349 A | 5/1994 | Daniels et al. | |
| 5,313,465 A | 5/1994 | Perlman et al. | |
| 5,333,302 A | 7/1994 | Hensley et al. | |
| 5,339,435 A | 8/1994 | Lubkin et al. | |
| 5,367,698 A | 11/1994 | Webber et al. | |
| 5,371,852 A | 12/1994 | Attanasio et al. | |
| 5,387,104 A | 2/1995 | Corder | |
| 5,410,703 A | 4/1995 | Nilsson et al. | |
| 5,423,032 A | 6/1995 | Byrd et al. | |
| 5,437,027 A | 7/1995 | Bannon et al. | |

(Continued)

OTHER PUBLICATIONS

RFC 4120—"The Kerberos Network Authentication Service V5," Neuman et al., Network Working Group, Jul. 2005.*

(Continued)

*Primary Examiner* — Nasser Moazzami
*Assistant Examiner* — Oscar A Louie
(74) *Attorney, Agent, or Firm* — Knobbe Martens Olson & Bear, LLP.

(57) ABSTRACT

Authentication credentials from legacy applications are translated to Kerberos authentication requests. Authentication credentials from the legacy application are directed to an authentication proxy module. The authentication proxy module acts as a credential translator for the application by receiving a set of credentials such as a user name and password, then managing the process of authenticating to a Kerberos server and obtaining services from one or more Kerberized applications, including Kerberos session encryption. A credential binding module associates a user corresponding to authentication credentials from a legacy authentication protocol with one or more Kerberos credentials. Anonymous authentication credentials may be translated to authentication requests for a network directory services object, such as a computer object or service object.

24 Claims, 4 Drawing Sheets

U.S. PATENT DOCUMENTS

| | | |
|---|---|---|
| 5,437,555 A | 8/1995 | Ziv-El |
| 5,440,719 A | 8/1995 | Hanes et al. |
| 5,441,415 A | 8/1995 | Lee et al. |
| 5,497,486 A | 3/1996 | Stolfo et al. |
| 5,497,492 A | 3/1996 | Zbikowski et al. |
| 5,499,379 A | 3/1996 | Tanaka et al. |
| 5,530,829 A | 6/1996 | Beardsley et al. |
| 5,550,968 A | 8/1996 | Miller et al. |
| 5,550,976 A | 8/1996 | Henderson et al. |
| 5,586,304 A | 12/1996 | Stupek, Jr. et al. |
| 5,590,360 A | 12/1996 | Edwards |
| 5,600,833 A | 2/1997 | Senn et al. |
| 5,608,874 A | 3/1997 | Ogawa et al. |
| 5,608,903 A | 3/1997 | Prasad et al. |
| 5,623,601 A | 4/1997 | Vu |
| 5,630,069 A | 5/1997 | Flores et al. |
| 5,630,131 A | 5/1997 | Palevich et al. |
| 5,659,735 A | 8/1997 | Parrish et al. |
| 5,659,736 A | 8/1997 | Hasegawa et al. |
| 5,666,502 A | 9/1997 | Capps |
| 5,671,428 A | 9/1997 | Muranaga et al. |
| 5,673,386 A | 9/1997 | Batra |
| 5,673,387 A | 9/1997 | Chen et al. |
| 5,675,782 A | 10/1997 | Montague et al. |
| 5,677,997 A | 10/1997 | Talatik |
| 5,680,586 A | 10/1997 | Elkins et al. |
| 5,692,132 A | 11/1997 | Hogan |
| 5,692,902 A | 12/1997 | Aeby |
| 5,694,540 A | 12/1997 | Humelsine et al. |
| 5,706,502 A | 1/1998 | Foley et al. |
| 5,708,812 A | 1/1998 | Van Dyke et al. |
| 5,710,884 A | 1/1998 | Dedrick |
| 5,711,671 A | 1/1998 | Geeslin et al. |
| 5,724,521 A | 3/1998 | Dedrick |
| 5,727,145 A | 3/1998 | Nessett et al. |
| 5,727,951 A | 3/1998 | Ho et al. |
| 5,740,427 A | 4/1998 | Stoller |
| 5,743,746 A | 4/1998 | Ho et al. |
| 5,745,113 A | 4/1998 | Jordan et al. |
| 5,745,902 A | 4/1998 | Miller et al. |
| 5,752,042 A | 5/1998 | Cole et al. |
| 5,754,173 A | 5/1998 | Hiura et al. |
| 5,754,938 A | 5/1998 | Herz et al. |
| 5,758,062 A | 5/1998 | McMahon et al. |
| 5,758,074 A | 5/1998 | Marlin et al. |
| 5,758,344 A | 5/1998 | Prasad et al. |
| 5,764,897 A | 6/1998 | Khalidi |
| 5,765,140 A | 6/1998 | Knudson et al. |
| 5,768,519 A | 6/1998 | Swift et al. |
| 5,774,551 A | 6/1998 | Wu et al. |
| 5,778,169 A | 7/1998 | Reinhardt |
| 5,784,553 A | 7/1998 | Kolawa et al. |
| 5,784,643 A | 7/1998 | Shields |
| 5,790,801 A | 8/1998 | Funato |
| 5,796,393 A | 8/1998 | MacNaughton et al. |
| 5,806,075 A | 9/1998 | Jain et al. |
| 5,812,669 A | 9/1998 | Jenkins et al. |
| 5,812,865 A | 9/1998 | Theimer et al. |
| 5,815,657 A | 9/1998 | Williams et al. |
| 5,819,265 A | 10/1998 | Ravin et al. |
| 5,819,281 A | 10/1998 | Cummins |
| 5,819,295 A | 10/1998 | Nakagawa et al. |
| 5,822,518 A | 10/1998 | Ooki et al. |
| 5,835,087 A | 11/1998 | Herz et al. |
| 5,835,911 A | 11/1998 | Nakagawa et al. |
| 5,838,918 A | 11/1998 | Prager et al. |
| 5,844,508 A | 12/1998 | Murashita et al. |
| 5,848,396 A | 12/1998 | Gerace |
| 5,859,972 A | 1/1999 | Subramaniam et al. |
| 5,872,928 A | 2/1999 | Lewis et al. |
| 5,872,973 A | 2/1999 | Mitchell et al. |
| 5,878,432 A | 3/1999 | Misheski et al. |
| 5,889,520 A | 3/1999 | Glaser |
| 5,890,161 A | 3/1999 | Helland et al. |
| 5,890,175 A | 3/1999 | Wong et al. |
| 5,892,898 A | 4/1999 | Fujii et al. |
| 5,893,074 A | 4/1999 | Hughes et al. |
| 5,893,076 A | 4/1999 | Hafner et al. |
| 5,930,512 A | 7/1999 | Boden et al. |
| 5,937,165 A | 8/1999 | Schwaller et al. |
| 5,949,419 A | 9/1999 | Domine et al. |
| 5,956,732 A | 9/1999 | Tsuchida |
| 5,956,736 A | 9/1999 | Hanson et al. |
| 5,960,200 A | 9/1999 | Eager et al. |
| 5,987,247 A | 11/1999 | Lau |
| 5,995,114 A | 11/1999 | Wegman et al. |
| 6,002,868 A | 12/1999 | Jenkins et al. |
| 6,003,047 A | 12/1999 | Osmond et al. |
| 6,014,669 A | 1/2000 | Slaughter et al. |
| 6,016,495 A | 1/2000 | McKeehan et al. |
| 6,029,178 A | 2/2000 | Martin et al. |
| 6,029,195 A | 2/2000 | Herz |
| 6,029,247 A | 2/2000 | Ferguson |
| 6,035,323 A | 3/2000 | Narayen et al. |
| 6,044,368 A | 3/2000 | Powers |
| 6,052,512 A | 4/2000 | Peterson et al. |
| 6,055,538 A | 4/2000 | Kessenich et al. |
| 6,058,260 A | 5/2000 | Brockel et al. |
| 6,058,379 A | 5/2000 | Odom et al. |
| 6,061,643 A | 5/2000 | Walker et al. |
| 6,061,650 A | 5/2000 | Malking et al. |
| 6,067,568 A | 5/2000 | Li et al. |
| 6,070,184 A | 5/2000 | Blount et al. |
| 6,076,166 A | 6/2000 | Moshfeghi et al. |
| 6,079,020 A | 6/2000 | Liu |
| 6,101,481 A | 8/2000 | Miller |
| 6,101,503 A | 8/2000 | Cooper et al. |
| 6,108,649 A | 8/2000 | Young et al. |
| 6,108,670 A | 8/2000 | Weida et al. |
| 6,112,228 A | 8/2000 | Earl et al. |
| 6,112,240 A | 8/2000 | Pogue et al. |
| 6,115,040 A | 9/2000 | Bladow et al. |
| 6,115,544 A | 9/2000 | Mueller |
| 6,134,548 A | 10/2000 | Gottsman et al. |
| 6,137,869 A | 10/2000 | Voit et al. |
| 6,138,086 A | 10/2000 | Rose et al. |
| 6,141,006 A | 10/2000 | Knowlton et al. |
| 6,141,010 A | 10/2000 | Hoyle |
| 6,141,647 A | 10/2000 | Meijer et al. |
| 6,151,600 A | 11/2000 | Dedrick |
| 6,151,610 A | 11/2000 | Senn et al. |
| 6,167,445 A | 12/2000 | Gai et al. |
| 6,167,564 A | 12/2000 | Fontana et al. |
| 6,170,009 B1 | 1/2001 | Mandal et al. |
| 6,182,226 B1 | 1/2001 | Reid et al. |
| 6,185,625 B1 | 2/2001 | Tso et al. |
| 6,195,794 B1 | 2/2001 | Buxton |
| 6,199,068 B1 | 3/2001 | Carpenter |
| 6,199,079 B1 | 3/2001 | Gupta et al. |
| 6,202,051 B1 | 3/2001 | Woolston |
| 6,205,480 B1 | 3/2001 | Broadhurst et al. |
| 6,208,345 B1 | 3/2001 | Sheard et al. |
| 6,209,000 B1 | 3/2001 | Klein et al. |
| 6,209,033 B1 | 3/2001 | Datta et al. |
| 6,222,535 B1 | 4/2001 | Hurd, II |
| 6,223,221 B1 | 4/2001 | Kunz |
| 6,230,160 B1 | 5/2001 | Chan et al. |
| 6,230,194 B1 | 5/2001 | Frailong et al. |
| 6,230,309 B1 | 5/2001 | Turner et al. |
| 6,233,584 B1 | 5/2001 | Purcell |
| 6,237,114 B1 | 5/2001 | Wookey et al. |
| 6,246,410 B1 | 6/2001 | Bergeron et al. |
| 6,249,905 B1 | 6/2001 | Yoshida et al. |
| 6,256,659 B1 | 7/2001 | McLain, Jr. et al. |
| 6,256,678 B1 | 7/2001 | Traughber et al. |
| 6,260,068 B1 | 7/2001 | Zalewski et al. |
| 6,263,352 B1 | 7/2001 | Cohen |
| 6,266,666 B1 | 7/2001 | Ireland et al. |
| 6,269,405 B1 | 7/2001 | Dutcher et al. |
| 6,269,406 B1 | 7/2001 | Dutcher et al. |
| 6,272,673 B1 | 8/2001 | Dale et al. |
| 6,272,678 B1 | 8/2001 | Imachi et al. |
| 6,279,030 B1 | 8/2001 | Britton et al. |
| 6,282,605 B1 | 8/2001 | Moore |
| 6,286,028 B1 | 9/2001 | Cohen et al. |
| 6,286,104 B1 | 9/2001 | Buhle et al. |
| 6,301,601 B1 | 10/2001 | Helland et al. |

| | | | |
|---|---|---|---|
| 6,304,893 B1 | 10/2001 | Gish | |
| 6,308,164 B1 | 10/2001 | Nummelin et al. | |
| 6,308,188 B1 | 10/2001 | Bernardo et al. | |
| 6,308,273 B1 | 10/2001 | Goertzel et al. | |
| 6,313,835 B1 | 11/2001 | Gever et al. | |
| 6,314,434 B1 | 11/2001 | Shigemi et al. | |
| 6,327,677 B1 | 12/2001 | Garg et al. | |
| 6,330,566 B1 | 12/2001 | Durham | |
| 6,336,118 B1 | 1/2002 | Hammond | |
| 6,341,287 B1 | 1/2002 | Sziklai et al. | |
| 6,345,239 B1 | 2/2002 | Bowman-Amuah | |
| 6,349,287 B1 | 2/2002 | Hayashi | |
| 6,363,398 B1 | 3/2002 | Andersen | |
| 6,370,573 B1 | 4/2002 | Bowman-Amuah | |
| 6,381,579 B1 | 4/2002 | Gervais et al. | |
| 6,401,085 B1 | 6/2002 | Gershman et al. | |
| 6,401,211 B1 | 6/2002 | Brezak et al. | |
| 6,405,364 B1 | 6/2002 | Bowman-Amuah | |
| 6,430,556 B1 | 8/2002 | Goldberg et al. | |
| 6,438,514 B1 | 8/2002 | Hill et al. | |
| 6,442,620 B1 | 8/2002 | Thatte et al. | |
| 6,446,096 B1 | 9/2002 | Holland et al. | |
| 6,453,317 B1 | 9/2002 | LaCost et al. | |
| 6,466,932 B1 | 10/2002 | Dennis et al. | |
| 6,469,713 B2 | 10/2002 | Hetherington et al. | |
| 6,473,794 B1 | 10/2002 | Guheen et al. | |
| 6,587,876 B1 | 7/2003 | Mahon et al. | |
| 6,615,258 B1 | 9/2003 | Barry et al. | |
| 6,678,714 B1 | 1/2004 | Olapurath et al. | |
| 6,757,696 B2 | 6/2004 | Multer et al. | |
| 6,760,761 B1 | 7/2004 | Sciacca | |
| 6,795,835 B2 | 9/2004 | Ricart et al. | |
| 6,801,946 B1 | 10/2004 | Child et al. | |
| 6,839,766 B1 | 1/2005 | Parnafes et al. | |
| 6,880,005 B1 | 4/2005 | Bell et al. | |
| 6,925,477 B1 | 8/2005 | Champagne et al. | |
| 6,950,935 B1 | 9/2005 | Allavarpu et al. | |
| 7,062,781 B2 | 6/2006 | Shambroom | |
| 7,080,077 B2 | 7/2006 | Ramamurthy et al. | |
| 7,089,584 B1* | 8/2006 | Sharma | 726/4 |
| 7,100,195 B1 | 8/2006 | Underwood | |
| 7,133,984 B1 | 11/2006 | Dickensheets | |
| 7,143,095 B2 | 11/2006 | Barrett et al. | |
| 7,162,640 B2 | 1/2007 | Heath et al. | |
| 7,185,073 B1 | 2/2007 | Gai et al. | |
| 7,243,370 B2 | 7/2007 | Bobde et al. | |
| 7,428,583 B1 | 9/2008 | Lortz et al. | |
| 7,440,962 B1 | 10/2008 | Wong et al. | |
| 7,487,535 B1 | 2/2009 | Isaacson et al. | |
| 7,519,813 B1 | 4/2009 | Cox et al. | |
| 7,617,501 B2 | 11/2009 | Peterson | |
| 2002/0112178 A1 | 8/2002 | Scherr | |
| 2002/0129274 A1 | 9/2002 | Baskey et al. | |
| 2002/0133723 A1 | 9/2002 | Tait | |
| 2002/0169986 A1 | 11/2002 | Lortz | |
| 2002/0169988 A1 | 11/2002 | Vandergeest et al. | |
| 2002/0174366 A1 | 11/2002 | Peterka et al. | |
| 2002/0178377 A1* | 11/2002 | Hemsath et al. | 713/201 |
| 2003/0009487 A1 | 1/2003 | Prabakaran et al. | |
| 2003/0018913 A1 | 1/2003 | Brezak et al. | |
| 2003/0023587 A1 | 1/2003 | Dennis et al. | |
| 2003/0065940 A1* | 4/2003 | Brezak et al. | 713/201 |
| 2003/0115313 A1 | 6/2003 | Kanada et al. | |
| 2003/0115439 A1 | 6/2003 | Mahalingam et al. | |
| 2003/0177388 A1 | 9/2003 | Botz et al. | |
| 2003/0226036 A1* | 12/2003 | Bivens et al. | 713/201 |
| 2003/0229783 A1 | 12/2003 | Hardt | |
| 2004/0010519 A1 | 1/2004 | Sinn et al. | |
| 2004/0059953 A1 | 3/2004 | Purnell | |
| 2004/0088543 A1 | 5/2004 | Garg et al. | |
| 2004/0098615 A1 | 5/2004 | Mowers et al. | |
| 2004/0111515 A1 | 6/2004 | Manion et al. | |
| 2004/0123146 A1 | 6/2004 | Himmel et al. | |
| 2004/0128506 A1* | 7/2004 | Blakley et al. | 713/170 |
| 2004/0128541 A1* | 7/2004 | Blakley et al. | 713/201 |
| 2004/0128542 A1* | 7/2004 | Blakley et al. | 713/201 |
| 2004/0139050 A1 | 7/2004 | Barrett et al. | |
| 2004/0139081 A1 | 7/2004 | Barrett et al. | |
| 2004/0260565 A1 | 12/2004 | Zimniewicz et al. | |
| 2004/0260651 A1 | 12/2004 | Chan et al. | |
| 2005/0010547 A1 | 1/2005 | Carinci et al. | |
| 2005/0086457 A1 | 4/2005 | Hohman | |
| 2005/0091068 A1 | 4/2005 | Ramamoorthy et al. | |
| 2005/0091213 A1 | 4/2005 | Schutz et al. | |
| 2005/0091290 A1 | 4/2005 | Cameron et al. | |
| 2005/0108579 A1 | 5/2005 | Isaacson et al. | |
| 2005/0114701 A1 | 5/2005 | Atkins et al. | |
| 2005/0193181 A1 | 9/2005 | Kaneda et al. | |
| 2005/0223216 A1 | 10/2005 | Chan et al. | |
| 2005/0267938 A1 | 12/2005 | Czeczulin | |
| 2005/0283443 A1 | 12/2005 | Hardt | |
| 2005/0283614 A1 | 12/2005 | Hardt | |
| 2006/0005229 A1 | 1/2006 | Palekar et al. | |
| 2006/0010445 A1 | 1/2006 | Peterson et al. | |
| 2006/0021017 A1* | 1/2006 | Hinton et al. | 726/10 |
| 2006/0026195 A1 | 2/2006 | Gu et al. | |
| 2006/0034494 A1 | 2/2006 | Holloran | |
| 2006/0116949 A1 | 6/2006 | Wehunt et al. | |
| 2006/0130065 A1 | 6/2006 | Chin et al. | |
| 2006/0161435 A1 | 7/2006 | Atef et al. | |
| 2006/0174350 A1 | 8/2006 | Roever et al. | |
| 2006/0184401 A1 | 8/2006 | DelGaudio et al. | |
| 2006/0200424 A1 | 9/2006 | Cameron et al. | |
| 2006/0200504 A1 | 9/2006 | Lo | |
| 2006/0224611 A1 | 10/2006 | Dunn et al. | |
| 2006/0248099 A1 | 11/2006 | Barrett et al. | |
| 2006/0282360 A1 | 12/2006 | Kahn et al. | |
| 2007/0011136 A1 | 1/2007 | Haskin et al. | |
| 2007/0083917 A1 | 4/2007 | Peterson et al. | |
| 2007/0100980 A1 | 5/2007 | Kataoka et al. | |
| 2007/0156766 A1 | 7/2007 | Hoang et al. | |
| 2007/0156767 A1 | 7/2007 | Hoang et al. | |
| 2007/0192843 A1 | 8/2007 | Peterson et al. | |
| 2007/0288992 A1 | 12/2007 | Robinson et al. | |
| 2008/0104220 A1 | 5/2008 | Vanyukhin et al. | |
| 2008/0104250 A1 | 5/2008 | Vanyukhin et al. | |
| 2008/0133533 A1 | 6/2008 | Ganugapati et al. | |
| 2008/0162604 A1 | 7/2008 | Soulet et al. | |
| 2010/0050232 A1 | 2/2010 | Peterson et al. | |

OTHER PUBLICATIONS

U.S. Appl. No. 12/200,814, filed on Aug. 8, 2008, Eyes, et al.
"Description of Digital Certificates", Jan. 23, 2007, http://www.support.microsoft.com/kb/195724.
"Directory Administrator", http://diradmin.open-it.org/indexlphp, pp. 1-3 Dec. 15, 2004.
"Kerberos Module for Apache", http://modauthkerb.sourceforge.net/ Dec. 15, 2004.
"LDAP Linux HOWTO", http://tldp/org/HOWTO/LDAP-HOWTO/, pp. 1-2 Mar. 5, 2004.
"Lnux Authentication Against Active Directory", http://laaad/sourceforge.netlen/home/htm, p. 1-2 12/15/2004.
"NegotiateAuth", http://negotiateauth,mozdev.org/ Jul. 8, 2010.
"PADL Software Pty Ltd" http://www.padl.com/productslXAD.html, pp. 1-3 Dec. 15, 2004.
"Project: AD4Unix: Summary", http://sourceforge.netlprojects/adunixl, pp. 1-3 Dec. 15, 2004.
"Replacing NIS with Kerberos and LDAP", http://ofb.netHhess/krbldap/, pp. 1-2 Dec. 15, 2004.
"Sadma", http://sadmas.sourceforge.netlen/indexlhtml. pp. 1-2 Dec. 15, 2004.
"Sun Enterprise Authentication Mechanism Data Sheet",http://wwws.sun.com/jsp_utils/Printpage.jsp?url, pp. 1-4.
A. Leonard, "Embrace, extend, censor", Originally published May 11, 2000 on salon.com, http://archive.salon.com/tech/log/2000/05/11/slashdot_censor/.
AIX 5L Differences Guide Version 5.2 Edition Published Dec. 24, 2002, Excerpt http://proquest.safaribooksonline.com/0738427047/ch09lev1sec13.
Alan H. Harbitter et al., "Performance of Public-Key-Enabled Kerberos Authentication in Large Networks", Proceedings of the IEEE symposium on Security and Privacy. 2001.
Antti Tikkanen, "Active Directory and nss_Idap for Linux: Centralized er Management," printed from http://www.hut.fi/cc/docskerberos/nss_Idap/htm, pp. 1-11, 2004.

Apurva Kumar, "The OpenLDAP Proxy Cache," IBM, India Research Lab, at least as early as May 2003.

Buell, D.A. et al., "Identity management", Internet Computing, IEEE vol. 7, Issue 6, Nov.-Dec. 2003 pp. :26-28.

Chapter 9 Authentication Protocols, Distributed System & Network Security Lab, Department of Computer Science & Information Engineering, National Chiao Tung University, pp. 21-22 1991.

COSuser — Identity management and user provisioning for Unix, Linux and Microsoft Windows® http://www.cosuser.com/ May 24, 2010.

Damiani, E., et al, "Managing multiple and dependable identities" Internet Computing, IEEE vol. 7, Issue 6, Nov.-Dec. 2003 pp.:29-37.

David "Del" Elson, "Active Directory and Linux," printed from http://www.securityfoc .com/printable/infoc /1563, pp. 1-11, 2002.

David F. Carr, "What's Federated Identity Management?", eWeek, Nov. 10, 2003, http://www.eweek.com/printarticle/O,1761.a-111811,00.asp.

Designing Network Security Published May 7, 1999. Excerpt http://proquest.safaribooksonline.com/1578700434/ch02lev1sec1.

Documentation for Kerberos V5 release krb5-1.3, Copyright 1985-2002, Installation Guide: http://web.mit.edu/Kerberos/krb5-1.6/krb5-1.6/doc/krb5-install.html.

Documentation for Kerberos V5 release krb5-1.3, Copyright 1985-2002, System Administrators Guide: http://web.mit.edu/Kerberos/krb5-1.6/krb5-1.6/doc/krb5-admin.html.

Documentation for Kerberos V5 release krb5-1.3, Copyright 1985-2002, UNIX User's Guide: http://web.mit.edu/kerberos/www/krb5-1.2/krb5-1.2.6/doc/user-guide.html.

European Office Action, Application No. 05728119.8 -1243 dated Apr. 9, 2009.

Fabini et al., "IMS in a Bottle: Initial Experiences from an OpenSER-based Prototype Implementation of the 3GPP IP Multimedia Subsystem" Mobile Business, 2006. ICMB '06. International Conference on Publication Date: 2006; On pp.: 13 —13.

Get to One Options for moving from multiple, Unix identities to a single, AD-based authentication infrastructure with Vintela Authentication Services http://www.quest.com/Vintela_Authentication_Services/migration_options_VAS.aspx.

Hank Simon, "SAML:The Secret to Centralized Identity Management", Dec. 2004, http://intelligententerprise.com/showArticle.jhtml?articleID=54200324.

Identity Managemwnt for UNIX http://teachnet2.microsoft.com/WindowsServer/en/library/ab66b7d2-9cfb-4d76-b707-30a5e0dd84f31033.mspx?mfr=true Aug. 22, 2005.

Implementing Registry-Based Group Policy for Applications, Microsoft Windows 2000 Server. White Paper. 2000.

International Preliminary Report on Patentability and Written Opinion for International Application No. PCT/US2006/039302, mailed on Apr. 2, 2009, in 7 pages.

International Search Report in International Application No. PCT/US2006/039302, mailed on Jul. 3, 2008.

Introduction to Group Policy in Windows Server 2003, Microsoft Corporation, Published Apr. 2003.

J. Barr, "The Gates of Hades: Microsoft attempts to co-opt Kerberos", Published Apr. 2000 as verified by the Internet Archive, http://web.archive.org/web/20000619011652/http://www.linuxworld.com/linuxworld/lw-2000-04/1w-04-vcontrol_3.html.

J. Brezak, "HTTP Authentication: SPNEGO Access Authentication as Implemented in Microsoft Windows 2000, " http://Meta.cesnet.cz/cms/opencms/en/docs/software/devel/draft-brezek-spnego-http-04.xt, pp/ 1-6 Oct. 2000.

J. Kohl et al. "RFC 1510: The Kerberos Network Authentication Service (V5)", Published Sep. 1993, http://ietfreport.isoc.org/rfc/PDF/rfc1510.pdf.

Jan De Clercq, "Win.NET Server Kerberos", http://www.winnetmag.com/WindowsSecurity/ArticleslArticleID/26450/pg/3/3.html Sep. 17, 2002.

John Brezak, "Interoperability with Microsoft Windows 2000 Active Directory and Kerberos Services,"printed from http://msdn.microsoft.com/library/en-/dnactdir/html/kerberossamp.asp?frame=true, pp. 1-4, 2000.

Kerneros, PACs, and Microsoft's Dirty Tricks Originally posted to slashdot.org on May 2, 2000, http://slashdot.org/comments.pl?sid=5268&threshold=1&commentsort=O&mode=thread&cid=1092650.

Langella, S. et al., "Dorian: Grid Service Infrastructure for Identity Management and Ferderation", Computer-Based Medical Systems, 2006. CBMS 2006. 19th IEEE International Symposium on Jun. 22-23, 2006 pp.: 756-761.

Li, M., et al., "Identity Management in vertical handovers for UMTS-WLAN networks", Mobile Business, 2005. ICMB 2005. International Conference on Jul. 11-13, 2005 pp.: 479-484.

LinuX® and Windows® Interoperability Guide, Published Dec. 14, 2001, Excerpt http://proquest.safaribooksonline.com/0130324779/ch18/lev1sec3.

Matsunaga et al, "Secure Authentication System for Public WLAN Roaming, Proceedings of the 1st ACM international workshop on Wireless mobile applications and services on WLAN hotspots,"San Diego, CA, A, Year of Publication: 2003, pp.: 113-121.

Matthew Hur, "Session Code: ARC2341 architecture & infrastructure" Microsoft Corporation Oct. 26, 2003.

MCSE in a Nutshell: The Windows 2000 Exams Published Feb. 2001. Excerpt http://proquest.safaribooksonline.com/0596000308/mcseian-CHP-13-SECT-1.

Mikkonen, H. et al., "Federated Identity Management for Grids"Networking and Services, 2006. ICNS '06. International conference on Jul. 16-18, 2006 pp. 69-69.

Mont, M.C. et al., "Towards accountable management of identity and privacy: sticky policies and enforceable tracing services", Database and Expert Systems Applications, 2003. Proceedigns. 14th International Workshop on Sep. 1-5, 2003 pp. 377-382.

NCSA Introduction to Kerberos 5, All right reserved Board of Trustees of the University of Illinois Page last updated May 21, 2002 http://www.ncsa.uiuc.edu/UserInfo/Resources/Sofiware/kerberosold/introduction.html.

Phiri, J. et al., "Modelling and Information Fusion in Digital Identity Management Systems"Networking, International Conference on Systems and International Conference on Mobile Communications and Learning Technologies, 2006. ICN/ICONS/MCL 2006. International Conference on Apr. 23-29, 2006 pp. 181-181.

Quest Software; "UNIX Identity Migration Wizard User Guide", 2006.

Radeke, E., et al. "Framework for object migration in federated database systems", Cooperation Univ. of Paderborn, Germany, Parallel and Distributed Information Systems, 1994., Proceedings of the Third International Conference on Publication Date: Sep. 28-30, 1994, on pp.: 187-194.

RFC 4120 - "The Kerberos Network Authentication Service V5," Neuman et al., Network Working Group, Jul. 2005.

Search Security, "Search Security.com Definitions", Jun. 4, 2007, http://searchsecurity.techtarget.com/sDefinition/0,,sid14_gci212437,00.html.

Shim, S.S.Y et al., "Federated identity management" Computer; vol. 38, Issue 12, Dec. 2005 pp.:120-122.

Shin, D. et al., "Ensuring information assurance in federated identity management", Performance, Computing, and Communications, 2004 IEEE International Conference on 2004 pp.:821-826.

Siddiqi, J. et al., "Secure ICT Services for Mobile and Wireless Communications: A Federated Global Identity Management Framework", Information Technology: New Generations, 2006. ITNG 2006. Third International Conference on Apr. 10-12, 2006 pp.:351-357.

Sixto Ortiz, Jr., "One-Time Password Technology", vol. 29, Issue 15, Apr. 13, 2007, http://www.processor.com/editorial/article.asp?article=articles%2Fp2915%F30p15%2F30p15.asp.

Subject 2.15. What do I need to do to setup cross-realm authentication?, http://www.cmf.nrl.navy.mil/CCS/people/kenh/kerberos-fag.html. Jul. 8, 2010.

The SLAPD and SLURPD Administrator's Guide, University of Michigan Release 3.3 Apr. 30, 1996, available at http://www.umich.edu/h~dirsvcs/Idap/doc/guides/slapd/guide.pdf.

Turbo Fredriksson, "LDAPv3." printed from http://www.bayour.com/LDAPv3-HOWTO.html, pp. 2-65, 2001.

Wedgetail Communications; "Security Assertion Markup Language (SAML)", 2004.

Weitzner, D.J., "In Search of Manageable Identity Systems", IEEE Internet Computing, vol. 10, Issue 6, Nov.-Dec. 2006 pp.:84 - 86.

Windows 2000 Kerberos Authentication White Paper, Microsoft Windows 2000 Server, pp. 1-5 and 41-42 Jul. 12, 2010.

Quest Vintela Authentication Services, Administrator's Guide Version 3.1, 2006.

*Windows 2000 Active Directory* by Alistair G. Lowe-Norris, Chapters 8 and 9, pp. 177-245, published Jan. 2000 (WAD).

U.S. Appl. No. 95/001,458, Inter Partes Reexamination Request of co-owned U.S. Patent No. 7,617,501.

\* cited by examiner

APPARATUS, SYSTEMS AND METHODS TO PROVIDE AUTHENTICATION SERVICES TO A LEGACY APPLICATION

BACKGROUND OF THE INVENTION

1. Field of the Invention

The present invention relates to computer network authentication services. Specifically, the invention relates to apparatus, methods, and systems for providing authentication services to legacy applications.

2. Description of the Related Art

In recent years, computer networks have been increasingly significant in terms of the quantity and sensitivity of the data communicated. Once used primarily for academic purposes, the Internet has become a vehicle for communicating such confidential information as credit card transactions, bank account transactions, and corporate intellectual property. The same applies to proprietary corporate networks. As the quantity and value of the data being communicated has increased, the threats to the security of this data have increased proportionately.

One of the technologies developed to address data security threats is Kerberos authentication. Kerberos provides a means for sensitive data to be communicated securely across an insecure network. Kerberos authentication relies on the existence of a Kerberos server that certifies a user's identity to network services utilized by an application the user is running. Services that use Kerberos to authenticate users are said to be "Kerberized."

Many organizations use legacy applications that are not capable of using Kerberized services. These organizations face the dilemma of undergoing an expensive upgrade or rewriting of their legacy applications, or facing the increasing threats to the security of their data.

Given the aforementioned issues and challenges related to providing authentication services and the shortcomings of currently available solutions, a need exists for an apparatus, method, and system for providing authentication services to legacy applications. Beneficially, such an apparatus, method, and system would translate legacy authentication services to Kerberos authentication services.

SUMMARY OF THE INVENTION

The present invention has been developed in response to the present state of the art, and in particular, in response to the problems and needs in the art that have not yet been fully solved by currently available authentication services. Accordingly, the present invention has been developed to provide an apparatus, method, and system for providing authentication services to legacy applications that overcome many or all of the above-discussed shortcomings in the art.

In one aspect of the present invention, an apparatus for providing authentication services to legacy applications includes an authentication translation module that receives authentication credentials corresponding to a legacy authentication protocol with the authentication proxy module further configured to authenticate the user corresponding to the received credentials using the Kerberos authentication protocol. The authentication proxy module may be further configured to authenticate users in circumstances where Kerberos authentication services are temporarily unavailable. In some embodiments, the apparatus for providing authentication services to legacy applications includes a credential binding module configured to associate legacy authentication credentials with corresponding Kerberos credentials.

In another aspect of the present invention, a method for providing authentication services to legacy applications includes directing authentication legacy authentication protocol credentials to a local authentication process that authenticates the user corresponding to the credentials, using the Kerberos authentication protocol. In one embodiment, the method further includes associating a plurality of users with corresponding legacy authentication credentials and Kerberos credentials. In another embodiment, the method further includes translating anonymous authentication requests to authentication requests for network directory services computer objects or service objects. This embodiment provides additional network security benefits by facilitating configuring network directory servers to prevent anonymous users from searching the network directory.

Various elements of the present invention may be combined into a system arranged to carry out the functions or steps presented above. In one embodiment, the system includes a client configured to authenticate using a legacy authentication protocol, an application configured to receive credentials from the client and direct them to an authentication proxy module, the authentication proxy module, a Kerberos server, and an application server that provides a Kerberos-secured service. Legacy authentication credentials are transmitted from the client to the authentication proxy module, which authenticates the user to the Kerberos server and passes the Kerberos credentials corresponding to the user to the Kerberos-secured service.

In some embodiments, the system may further include a credential binding module that associates each user with the corresponding legacy authentication credentials and one or more Kerberos credentials. In various embodiments, the legacy authentication credentials may include a user name, password, biometric, or the like. In various embodiments, the legacy authentication protocol may be RADIUS, TACACS, or the like, or may be a data access protocol that involves authentication such as ftp, LDAP, SQL, ODBC, or the like.

The present invention facilitates providing authentication services to legacy applications. These and other features and advantages of the present invention will become more fully apparent from the following description and appended claims, or may be learned by the practice of the invention as set forth hereinafter.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 2:
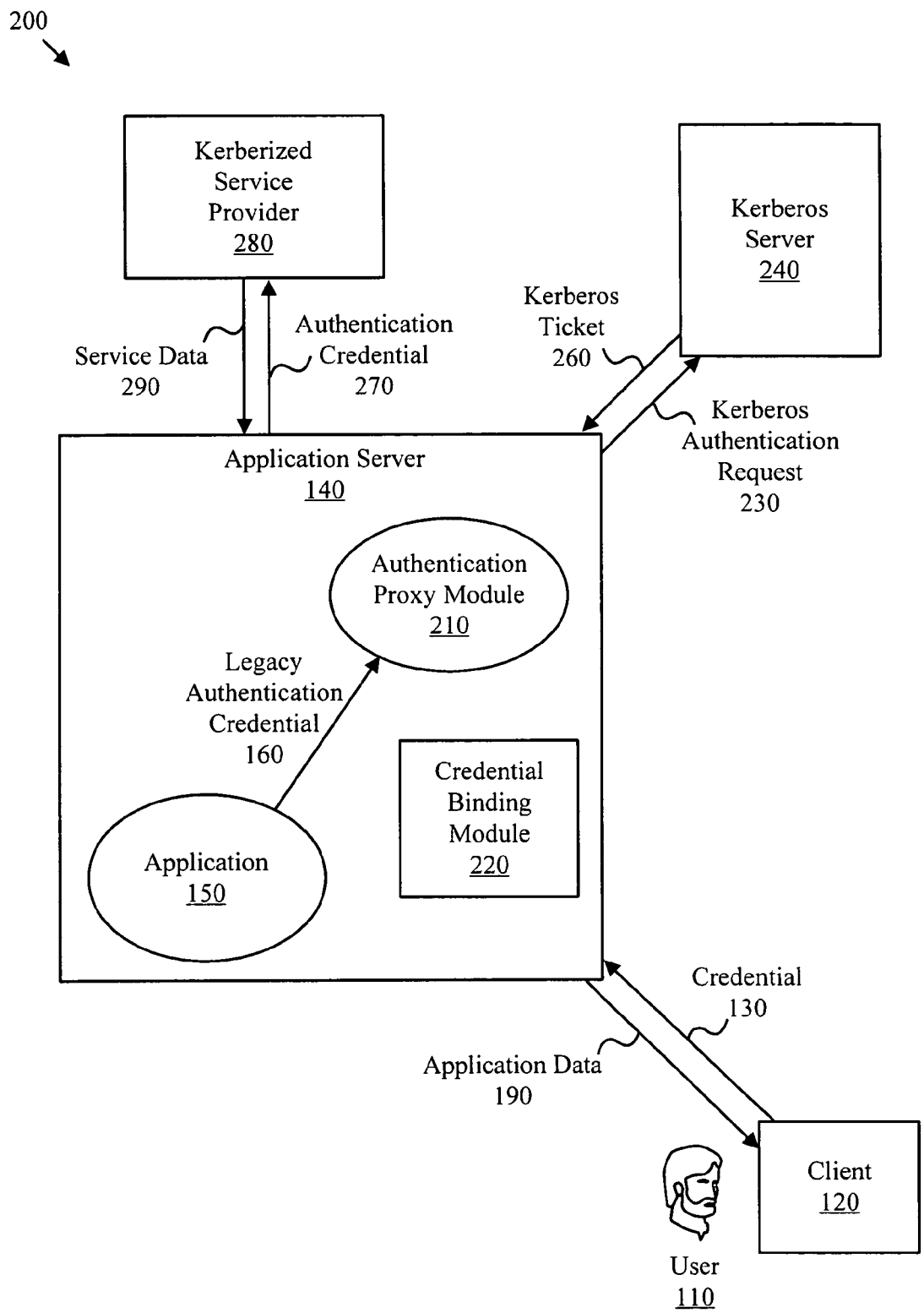
FIG. 2 is a block diagram illustrating an authentication protocol translation system in accordance with the present invention.
Figure 3:
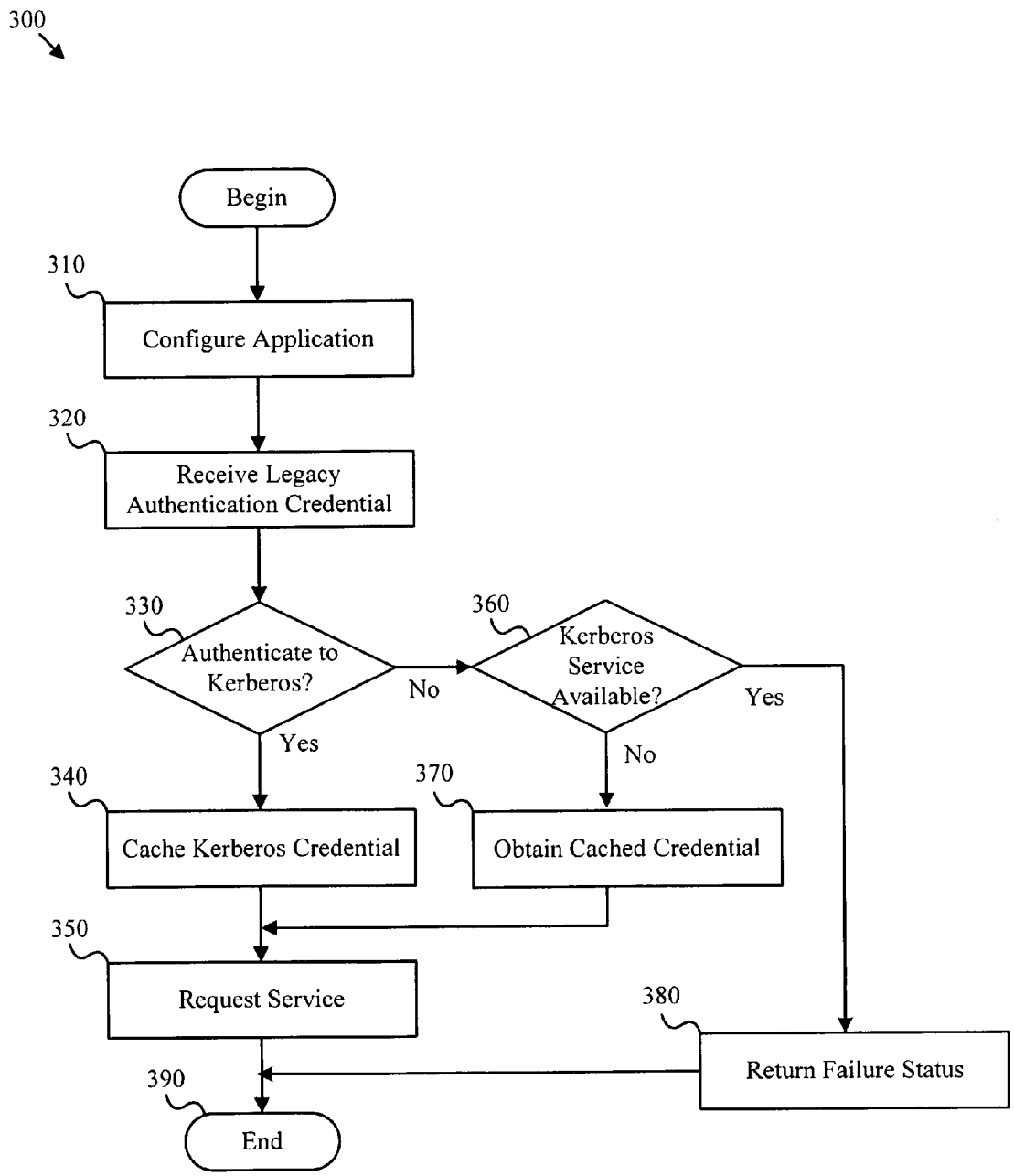
FIG. 3 is a flow chart diagram illustrating one embodiment of an authentication protocol translation method of the present invention.

It will be readily understood that the components of the present invention, as generally described and illustrated in the Figures herein, may be arranged and designed in a wide variety of different configurations. Thus, the following more detailed description of the embodiments of the apparatus, method, and system of the present invention, as represented in FIGS. 2 and 3, is not intended to limit the scope of the invention, as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices, such as a computer readable storage medium. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

The features, structures, or characteristics of the invention described throughout this specification may be combined in any suitable manner in one or more embodiments. For example, reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," or similar language throughout this specification do not necessarily all refer to the same embodiment and the described features, structures, or characteristics may be combined in any suitable manner in one or more embodiments.

The present invention sets forth an apparatus, system and method for providing authentication services to legacy applications. Authentication requests from legacy applications are directed to an authentication proxy module that translates authentication requests to authenticate to Kerberized services. From the user's standpoint, there is no change in the authentication process, nor is any modification required to the legacy application.

Figure 1:
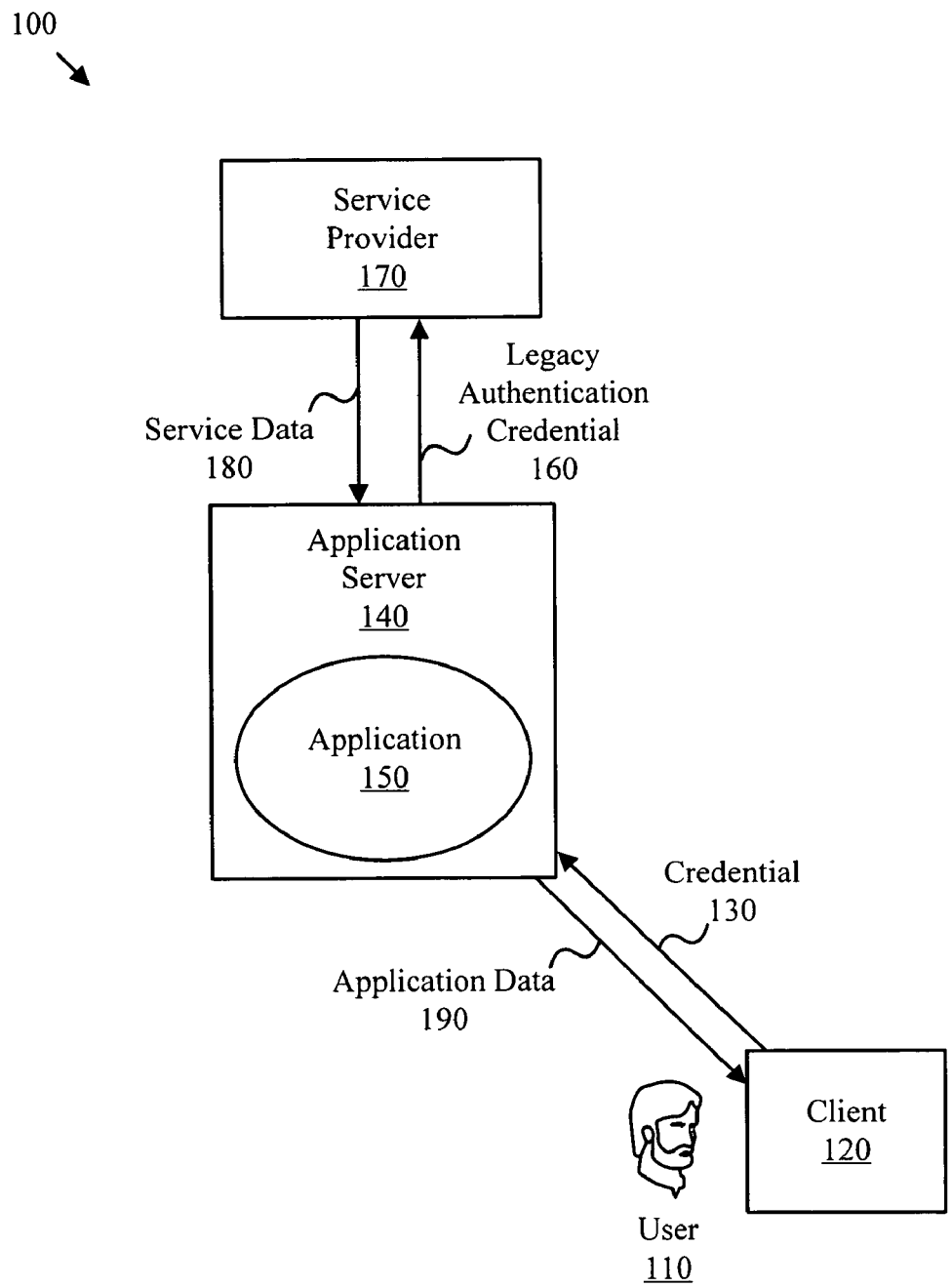
FIG. 1 is a block diagram illustrating a typical prior art authentication system.

FIG. 1 is a block diagram illustrating a typical prior art authentication system 100. The prior art authentication system 100 includes a user 110, a client 120, a credential 130, an application server 140, an application 150, an authentication credential 160, a service provider 170, service data 180, and application data 190. The authentication credential 160 typically uses an authentication protocol less secure than Kerberos, such as LDAP, TACACS, or RADIUS, and may even involve passing a user name and password to the service provider 170 in clear text via an unsecured network.

The user 110 enters a credential 130 at the client 120 at the request of the application 150 running on the application server 140. The credential 130 typically consists of a user name and password. The application 150 utilizes services provided by the service provider 170 and authenticates to it by passing the authentication credential 160. The service provider returns service data 180 to the application 150. The cycle completes when the application 150 returns application data 190 to the client 120. In other embodiments, application data 190 may be stored in a database or directed to another process or service.

Because the authentication credential 160 may be transmitted across an unsecured network, it is subject to eavesdropping attacks in which an unauthorized user copies the authentication credential 160 as it is transmitted, or spoofing attacks in which an unauthorized user intercepts the authentication credential 160 by emulating the service provider 170. Replacing the service provider 170 with a Kerberized service may prevent such attacks, but the legacy application 150 is not configured to authenticate using Kerberos. Because the Kerberos authentication algorithm is more complex than older authentication protocols, it is typically not possible to reconfigure a legacy application 150 to use Kerberos authentication, and rewriting a legacy application 150 to authenticate using Kerberos typically involves a considerable investment of cost and time. A further advantage to replacing service provider 170 with a Kerberized service is that duplicate user accounts on servers in an organization's network may be consolidated, thereby reducing the administrative overhead required.

FIG. 2 is a block diagram illustrating an authentication protocol translation system 200 in accordance with the present invention. The authentication protocol translation system 200 may include components of the prior art authentication system 100 and may additionally include an authentication proxy module 210, a credential binding module 220, a Kerberos authentication request 230, a Kerberos server 240, a Kerberos ticket 260, an authentication credential 270, a Kerberized service provider 280, and service data 290. The authentication protocol translation system 200 facilitates translation of the credential 130 to an authentication request 230 that allows authentication to the Kerberized service provider 280. In some embodiments, the Kerberos ticket 260 may be a Kerberos identity.

In one embodiment, legacy authentication credentials 160 are configured to be submitted from the application 150 to the authentication proxy module 210. The authentication proxy module 210 receives the authentication credential 160 from the application 150 and invokes a corresponding Kerberos authentication request 230 for the Kerberos server 240. The Kerberos server 240 returns a Kerberos ticket 260 to the authentication proxy module 210, which then submits an authentication credential 270 to the Kerberized service provider 280. Once authentication to the Kerberized service provider 280 has completed successfully, service data 290 may be returned to the legacy application 150. In the embodiment depicted in FIG. 2, the authentication proxy module 210 runs on the application server 140. In other embodiments, the authentication proxy module 210 resides on a separate server.

The Kerberos protocol is actually more complex than represented in FIG. 2. For example, in response to the Kerberos authentication request 230, the Kerberos server 240 issues a service key to both the Kerberized service provider 280 and the issuer of the Kerberos authentication request, the authentication proxy module 210 in this embodiment. For purposes of simplicity, some details of the Kerberos authentication protocol are not depicted in FIG. 2, but are represented by the Kerberos ticket 260 and the authentication credential 270 that the authentication proxy module 210 submits to the Kerberized service provider 280.

In some embodiments, a credential binding module 220 includes an association between the legacy authentication protocol credentials for each user 110 and the corresponding Kerberos authentication credentials. In other embodiments, the association between the legacy and corresponding Kerberos credentials for each user 110 may be intrinsic to the authentication proxy module 210. In some embodiments, the credential binding module associates credentials corresponding to a legacy authentication protocol with a Kerberos identity, rather than a cached Kerberos ticket 260.

FIG. 3 is a flow chart diagram illustrating one embodiment of an authentication protocol translation method 300 of the present invention. The authentication protocol translation method 300 includes a configure application operation 310, a receive legacy authentication credential operation 320, an authenticate to Kerberos test 330, a cache Kerberos credential operation 340, a request service operation 350, a Kerberos service available test 360, an obtain cached credential operation 370, and a return failure status operation 380. The authentication protocol translation method 300 facilitates translation of an authentication credential 160 issued by a legacy application 150 into a Kerberos authentication request 230 resulting in authentication to a Kerberized service provider 280.

The configure application operation 310 initializes the authentication proxy module 210 by directing the authentication credential 160 from the service provider 170 to the authentication proxy module 210. The authentication proxy module 210 thereafter is configured to receive a legacy authentication credential from the application 150 and intermediate between the legacy application 150 and the Kerberized service provider 280. In some embodiments, the legacy application 150 is configured to submit the authentication credential 160 to the authentication proxy module 210, rather than the service provider 170. In some embodiments, the configure application operation 310 is a setup program for the authentication protocol translation apparatus comprising the authentication proxy module 210 and the credential binding module 220.

The receive legacy authentication credential operation 320 receives an authentication credential 160 directed to the authentication proxy module 210. The authentication credential 160 may include a user name and password passed in clear text. In some embodiments, the receive legacy authentication credential operation 320 enters the authentication credential 160 into a table or database for later association with the corresponding Kerberos ticket 260. In some embodiments, the authentication credential 160 is stored in encrypted form. In some embodiments, the authentication credential 160 may be associated with a Kerberos identity.

In some embodiments, the authentication credential 160 may be stored in a database in clear text or encrypted form or be newly-assigned for the user 110. The receive legacy authentication credential operation 320 may receive the legacy authentication credential 160 from a database or user account initialization process to obtain a corresponding Kerberos ticket 260. Although the Kerberos ticket 260 may be expired when the user 110 subsequently authenticates, successfully decrypting the Kerberos ticket 260 using the authentication credential 160 submitted by the user 110 demonstrates that the authentication credential provided is correct. Generating the Kerberos ticket 260 prior to user 110 authentication facilitates subsequent authentication of the user 110 when the Kerberos server 240 is not available, even though the user 110 may never have previously authenticated to the network.

The authenticate to Kerberos test 330 determines whether the user 110 can be authenticated to the Kerberos server 240 after submitting a Kerberos authentication request 230. If the Kerberos server 240 returns a Kerberos ticket 260 to the authentication proxy module 210, the authentication protocol translation method 300 continues with the cache Kerberos credential operation 340. Otherwise, the authentication protocol translation method 300 continues with the return failure status operation 380.

The cache Kerberos credential operation 340 associates the Kerberos ticket 260 with the authentication credential 160 corresponding to the user 110. In some embodiments, the cache Kerberos credential operation 340 enters the Kerberos ticket 260 into the table or database utilized by the legacy authentication credential operation 320. In various embodiments, the table or database may be intrinsic to the authentication proxy module 210 or may be included in the credential binding module 220.

The request service operation 350 submits an authentication credential 270 in accordance with the Kerberos authentication protocol to the Kerberized service provider 280 and receives any service data 290 returned by the Kerberized service provider 280. The service data 290 is then redirected to the legacy application 150. The service data 290 returned by the Kerberized service provider 280 is returned in encrypted form, using a temporary service key provided by the Kerberos server 240. Transmitting the service data in encrypted form increases the security of the service provided by the Kerberized service provider 280. In some embodiments, the authentication proxy module 210 receives service data 290 and returns the service data 290 to the application 150 as a proxy for the non-Kerberized service provider 170. Upon completion of the request service operation, the authentication protocol translation method 300 ends 390.

The Kerberos service available test 360 determines whether Kerberos authentication failed because the Kerberos server did not respond, due to a network error, hardware failure, or the like. If authentication failed because the Kerberos service was not available, the authentication protocol translation method 300 continues with the obtain cached credential procedure 370. Otherwise, the authentication protocol translation method 300 continues with the return failure status operation 380.

The obtain cached credential operation 370 obtains the cached Kerberos ticket 260 with the authentication credential 160 corresponding to the user 110. The authentication credential 160 may be considered valid if the cached Kerberos ticket 260 can be successfully decrypted using the authentication credential 160. Using the cached Kerberos ticket 260 facilitates uninterrupted access to services provided by the Kerberized service provider 280 when the Kerberos server 240 is unavailable due to network failure or the like. In some embodiments, the authentication protocol translation method 300 provides the cached Kerberos ticket 260 as long as the ticket remains valid, thus reducing the number of authentication requests submitted to the Kerberos server 240.

The return failure status operation 380 reports a failure to authenticate to the Kerberos server 240 to the legacy application 150. In some embodiments, the return failure status operation 380 may delete the authentication credential 160 from the table or database in which it was stored by the receive legacy authentication credential operation 320. Upon completion of the return failure status operation 360, the authentication protocol translation method 300 ends 390.

Figure 4:
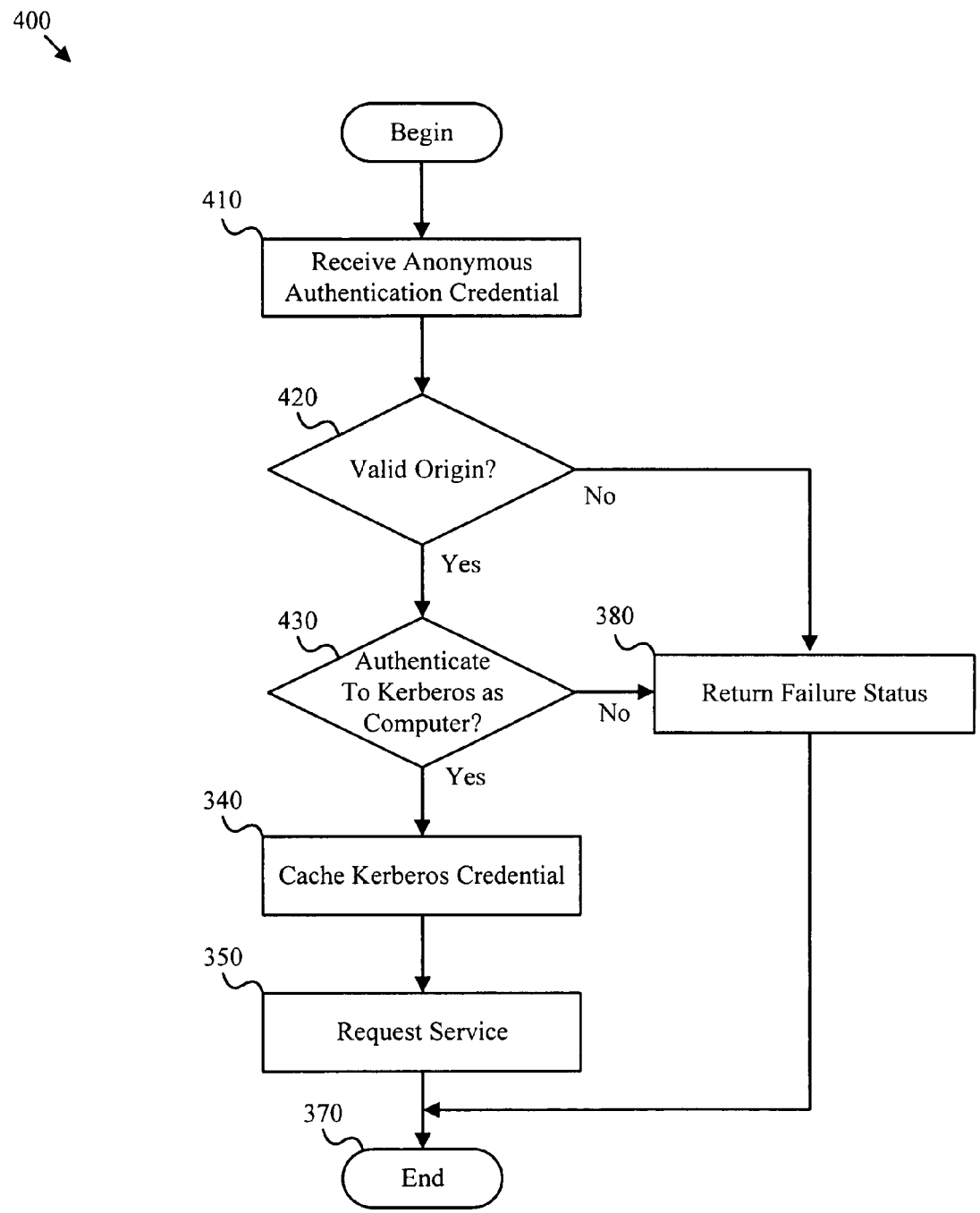
FIG. 4 is a flow chart diagram illustrating an anonymous user authentication protocol translation method of the present invention.

FIG. 4 is a flow chart diagram illustrating an anonymous user authentication protocol translation method 400 of the present invention. The anonymous user authentication protocol translation method 400 includes procedures of the authentication protocol translation method 300. In addition, the anonymous user authentication protocol translation method 400 includes a receive anonymous authentication credential operation 410, a valid origin test 420, and an authenticate to Kerberos as computer test 430.

The anonymous user authentication protocol translation method 400 translates anonymous bind requests into Kerberos authentication requests for the computer object or service object associated with the client 120 from which the anonymous bind request originates. The Kerberos server 240 can be configured to not accept anonymous bind requests, thus protecting the Kerberos server 240 from attack from foreign network addresses. Once the client 120 has authenticated as a computer object or service object, the client 120 may then be permitted to search the network directory. For example, the user 110 may enter a common name and password, which the authentication proxy module 210 may use to search the directory to obtain the distinguished name associated with the common name, so that the user 110 may be authenticated using the associated distinguished name and password.

Since there are no network directory objects associated with anonymous binds, there is no mechanism for the network administrator to manage computers that connect using anonymous binds. Converting anonymous binds to computer object authentications facilitates management of the associated computers using network directory services prior to authentication. For example, a computer object can be assigned to an organizational unit, so that a login script associated with the organizational unit is executed when the computer object authenticates. Additionally, converting anonymous binds to computer object authentications increases network security by allowing only a trusted client 120 to access network directory services. For example, when unauthorized users are permitted to bind to the network directory service anonymously, they may obtain user names that may be used with a dictionary attack to obtain unauthorized access to the network.

The receive anonymous authentication credential operation 410 receives an anonymous authentication credential corresponding to the authentication credential 160. In some embodiments, an anonymous authentication credential 160 may include a common name and network password of a user to be authenticated using the distinguished name associated with the common name.

The valid origin test 420 verifies that the authentication credential 160 originated from a trusted source. In some embodiments, the application server 140 may be configured such that the authentication credential 160 is received from a secure network. If the authentication credential 160 originated from a trusted source, the anonymous user authentication protocol translation method 400 continues with the authenticate to Kerberos as computer test 430. Otherwise, the anonymous user authentication protocol translation method 400 continues with the return failure status procedure 380.

The authenticate to Kerberos as computer test 430 determines whether the authentication proxy module 210, acting as a proxy for the client 120, can authenticate to Kerberos as a computer object. In some embodiments, the authentication proxy module 210 uses one service account for a plurality of clients 120. Authentication may not be possible if the Kerberos server is unavailable due to a network failure. If the authentication proxy module 210 authenticates to Kerberos, the anonymous user authentication protocol translation method 400 continues with the cache Kerberos credential procedure 340. Otherwise, the anonymous user authentication protocol translation method 400 continues with the return failure status procedure 380.

The present invention facilitates providing authentication services to legacy applications. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system to provide authentication services to legacy applications, the system comprising:
   one or more legacy applications executing on an application server and configured to authenticate a user based on one or more user credentials received from a client using a legacy authentication protocol, wherein the one or more legacy applications are not configured to authenticate using a Kerberos authentication protocol;
   an authentication proxy module executing on a computing device and configured to receive legacy authentication credentials from the one or more legacy applications corresponding to the legacy authentication protocol, wherein the legacy authentication credentials are associated with the one or more user credentials; and
   a credential binding module in communication with the authentication proxy module and configured to associate the legacy authentication credentials with a cached Kerberos credential,
   and wherein the authentication proxy module is further configured to: (i) authenticate the user corresponding to the legacy authentication credentials using a Kerberos authentication protocol by invoking a Kerberos authentication request to a Kerberos server, and (ii) use the cached Kerberos credential received from the credential binding module to authenticate the user when the Kerberos server is temporarily unavailable.

2. The system of claim 1, wherein the cached Kerberos credential comprises a previously-generated Kerberos credential, and wherein the authentication proxy module is further configured to use the previously-generated Kerberos credential to authenticate a user that has not previously been authenticated by the one or more legacy applications, when the Kerberos server is temporarily unavailable.

3. The system of claim 1, wherein the authentication proxy module is further configured to eliminate anonymous binds by authenticating as a network directory services object as a proxy for an anonymous user.

4. The system of claim 1, wherein the legacy authentication credentials comprise a user name and password.

5. The system of claim 1, wherein the legacy authentication credentials comprise a biometric.

6. The system of claim 1, wherein the legacy authentication protocol is selected from the group consisting of RADIUS, TACACS, ftp, LDAP, SQL and ODBC.

7. The system of claim 1, wherein the application server comprises the computing device.

8. The system of claim 1, wherein the cached Kerberos credential comprises a Kerberos ticket.

9. The system of claim 1, wherein the authentication proxy module is further configured to determine availability of the Kerberos server.

10. An apparatus to provide authentication services to legacy applications, the apparatus comprising:
   an authentication proxy module executing on a computing device and configured to receive from one or more legacy applications executing on an application server legacy authentication credentials corresponding to a legacy authentication protocol, wherein the one or more legacy applications are not configured to use a Kerberos authentication protocol to authenticate a user; and
   a credential binding module in communication with the authentication proxy module and configured to associate the legacy authentication credentials with a Kerberos credential,
   and wherein the authentication proxy module is further configured to: (i) authenticate a user corresponding to the legacy authentication credentials using a Kerberos authentication protocol by invoking a Kerberos authentication request to a Kerberos server, and (ii) use the Kerberos credential received from the credential binding module to authenticate the user when the Kerberos server is temporarily unavailable.

11. The apparatus of claim 10, wherein the Kerberos credential comprises a previously-generated Kerberos credential, and wherein the authentication proxy module is further configured to use the previously-generated Kerberos credential to authenticate a user that has not previously been authenticated by the one or more legacy applications, when Kerberos authentication services are temporarily unavailable.

12. The apparatus of claim 10, wherein the authentication proxy module is further configured to eliminate anonymous binds by authenticating an anonymous user as a network directory services object.

13. The apparatus of claim 10, wherein the legacy authentication credentials comprise a user name and password.

14. The apparatus of claim 10, wherein the legacy authentication credentials comprise a biometric.

15. The apparatus of claim 10, wherein the legacy authentication protocol is selected from the group consisting of RADIUS, TACACS, ftp, LDAP, SQL and ODBC.

16. A method of providing authentication services to legacy applications, the method comprising:
   directing from one or more legacy applications executing on an application server legacy authentication credentials corresponding to a legacy authentication protocol to a local authentication process executing on a computing device, wherein the one or more legacy applications are not configured to use a Kerberos authentication protocol to authenticate a user;
   receiving the legacy authentication credentials with the local authentication process;
   associating with a binding module the legacy authentication credentials with a Kerberos credential; and
   with the local authorization process: (i) when a Kerberos server coupled to the computing device is available, authenticating a user corresponding to the legacy authentication credentials using a Kerberos authentication protocol in response to receiving the authentication credentials by invoking a Kerberos authentication request to the Kerberos server, and (ii) using the Kerberos credential received from the binding module to authenticate the user when the Kerberos server is unavailable.

17. The method of claim 16, further comprising eliminating anonymous binds by authenticating an anonymous user as a network directory services object.

18. The method of claim 16, wherein the Kerberos credential comprises a Kerberos identity.

19. The method of claim 16, wherein the Kerberos credential comprises a Kerberos ticket.

20. The method of claim 19, wherein using the Kerberos credential received from the binding module to authenticate the user comprises decrypting the Kerberos ticket using user-submitted credentials associated with the legacy authentication credentials.

21. The method of claim 20, further comprising using the Kerberos ticket received from the binding module to authenticate the user following expiration of the Kerberos ticket.

22. The method of claim 16, further comprising determining with the local authorization process when the Kerberos server is unavailable.

23. A computer readable storage medium comprising computer readable program code configured to execute on a processor to carry out a method to providing authentication services to legacy applications, the method comprising:
   directing from one or more legacy applications on an application server legacy authentication credentials corresponding to a legacy authentication protocol to a local authentication process executing on a computing device, wherein the one or more legacy applications are not configured to use a Kerberos authentication protocol to authenticate a user;
   receiving the legacy authentication credentials with the local authentication process;
   associating with a binding module the legacy authentication credentials with a Kerberos credential; and
   with the local authorization process: (i) when a Kerberos server coupled to the computing device is available, authenticating a user corresponding to the legacy authentication credentials using a Kerberos authentication protocol in response to receiving the authentication credentials by invoking a Kerberos authentication request to the Kerberos server, and (ii) using the Kerberos credential received from the binding module to authenticate the user when the Kerberos server is unavailable.

24. The computer readable storage medium of claim 23, wherein the method further comprises eliminating anonymous binds by authenticating an anonymous user as a network directory services object.

* * * * *

(12) INTER PARTES REEXAMINATION CERTIFICATE (633rd)

United States Patent
Bowers et al.

(10) Number: US 7,904,949 C1
(45) Certificate Issued: Jul. 9, 2013

(54) APPARATUS, SYSTEMS AND METHODS TO PROVIDE AUTHENTICATION SERVICES TO A LEGACY APPLICATION

(75) Inventors: John Joseph Bowers, Provo, UT (US); Matthew T Peterson, Lindon, UT (US)

(73) Assignee: Wells Fargo Foothill, LLC, Santa Monica, CA (US)

Reexamination Request:
No. 95/001,872, Jan. 12, 2012

Reexamination Certificate for:
Patent No.: 7,904,949
Issued: Mar. 8, 2011
Appl. No.: 11/311,215
Filed: Dec. 19, 2005

(51) Int. Cl.
| | |
|---|---|
| *G06F 7/04* | (2006.01) |
| *G06F 15/16* | (2006.01) |
| *G06F 17/30* | (2006.01) |
| *H04L 29/06* | (2006.01) |
| *H04L 9/32* | (2006.01) |
| *H04L 9/00* | (2006.01) |
| *H04N 7/16* | (2011.01) |
| *B41K 3/38* | (2006.01) |
| *H04K 1/00* | (2006.01) |

(52) U.S. Cl.
USPC ............ 726/10; 726/27; 713/155; 713/168; 380/59; 380/255; 380/277

(58) Field of Classification Search
None
See application file for complete search history.

(56) References Cited

To view the complete listing of prior art documents cited during the proceeding for Reexamination Control Number 95/001,872, please refer to the USPTO's public Patent Application Information Retrieval (PAIR) system under the Display References tab.

*Primary Examiner* — Salman Ahmed

(57) ABSTRACT

Authentication credentials from legacy applications are translated to Kerberos authentication requests. Authentication credentials from the legacy application are directed to an authentication proxy module. The authentication proxy module acts as a credential translator for the application by receiving a set of credentials such as a user name and password, then managing the process of authenticating to a Kerberos server and obtaining services from one or more Kerberized applications, including Kerberos session encryption. A credential binding module associates a user corresponding to authentication credentials from a legacy authentication protocol with one or more Kerberos credentials. Anonymous authentication credentials may be translated to authentication requests for a network directory services object, such as a computer object or service object.

At the time of issuance and publication of this certificate, the patent remains subject to pending reissue application number 13/789,529 filed Mar. 7, 2013. The claim content of the patent may be subsequently revised if a reissue patent is issued from the reissue application.

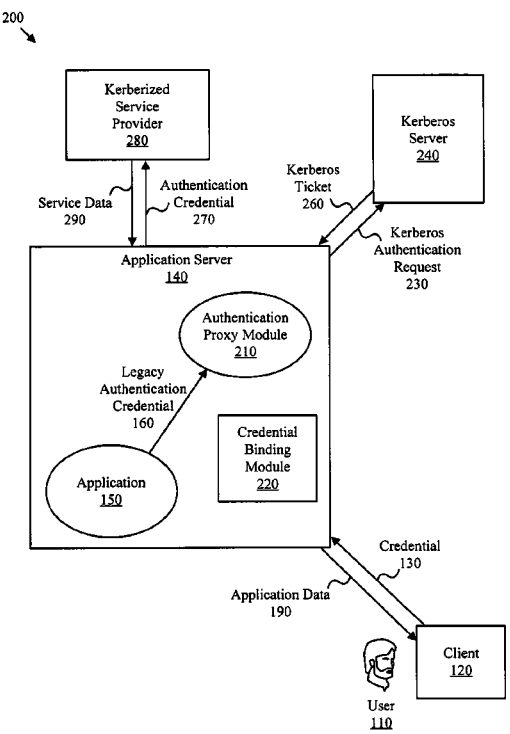

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

The patentability of claims 3, 12, 17, 21 and 24 is confirmed.

Claims 1, 4, 6-10, 13, 15, 16, 18-20, 22 and 23 are cancelled.

Claims 2, 5, 11 and 14 were not reexamined.

\* \* \* \* \*